US 6,674,937 B1

(12) United States Patent
Blair et al.

(10) Patent No.: US 6,674,937 B1
(45) Date of Patent: Jan. 6, 2004

(54) OPTICAL WAVELENGTH ROUTING CIRCUITS

(75) Inventors: Steven M. Blair, Salt Lake City, UT (US); Larry L. Campbell, Salt Lake City, UT (US)

(73) Assignee: LC2I, Inc., Salt Lake City, UT (US)

( * ) Notice: Subject to any disclaimer, the term of this patent is extended or adjusted under 35 U.S.C. 154(b) by 14 days.

(21) Appl. No.: 10/044,804

(22) Filed: Jan. 11, 2002

Related U.S. Application Data
(60) Provisional application No. 60/261,406, filed on Jan. 11, 2001.

(51) Int. Cl.[7] .................................................. G02B 6/28
(52) U.S. Cl. .............................. 385/24; 385/16; 385/22; 372/20; 359/124
(58) Field of Search .............................. 385/16–24, 37; 372/20, 32; 359/124, 130, 127

(56) References Cited

U.S. PATENT DOCUMENTS

| 4,882,775 A | 11/1989 | Coleman |
| 5,606,446 A | 2/1997 | Davis et al. |
| 5,691,832 A | 11/1997 | Liedenbaum et al. |
| 6,111,679 A | 8/2000 | Fishman |
| 6,493,119 B1 * | 10/2002 | Kuo et al. ................. 359/128 |
| 6,486,984 B1 * | 11/2002 | Baney et al. ............. 385/24 X |
| 6,501,866 B2 * | 12/2002 | Thomas .................... 385/24 X |

* cited by examiner

*Primary Examiner*—Phan T. H. Palmer
(74) *Attorney, Agent, or Firm*—R. Steven Coursey, Esq.; Troutman Sanders LLP (57) ABSTRACT

The present invention comprises apparatuses and methods, for routing optical communication signals over all DWDM wavelength channels. Incoming wavelength channels are separated into a plurality of sub-groups having a smaller optical bandwidth. Wavelength channels within each sub-group are then acted upon independently by a filter, or switch, tunable and operable over the bandwidth of each sub-group. The invention may be embodied in a plurality of dynamic wavelength routing circuits including 1×N and N×N circuits. The 1×N circuit embodiments may be used when the filter free-spectral range is smaller than the full DWDM bandwidth. These embodiments are less complicated than the N×N circuit embodiments, but do not provide the same routing bandwidth. The N×N circuit embodiments may be used to route the full DWDM bandwidth and may be used for other routing operations having large bandwidth demand.

26 Claims, 7 Drawing Sheets

OPTICAL WAVELENGTH ROUTING CIRCUITS

CROSS-REFERENCE TO RELATED APPLICATION

This patent application claims priority on and the benefit of the filing date of U.S. provisional patent application No. 60/261,406 filed on Jan. 11, 2001.

FIELD OF THE INVENTION

The present invention relates, generally, to the field of apparatus and methods for use in optical telecommunication networks and, in its preferred embodiments, to the field of apparatus and methods for dynamically routing wavelength channels in optical fiber DWDM networks.

BACKGROUND OF THE INVENTION

In the modern age of information exchange, many companies depend upon telecommunications networks to carry out their daily business and often rely upon telecommunications providers to supply a fast and reliable network with a very high bandwidth. For today's large scale telecommunication applications, optical fiber dense wavelength division multiplexed ("DWDM") networks appear to be a very good first generation solution which address and/or meet such requirements. The challenge, however, is to optimize the capabilities of optical networks to create a second generation network for use in the future.

The second generation of optical networks may use transparent optical routing of numerous wavelength channels. While it is desirable to route such wavelength channels entirely in the optical domain using integrated optics technology, such routing presents a number of technological challenges. One of the main challenges is that such routing may require the use of wavelength-selective filtering elements compatible with integrated optics. Unfortunately, such wavelength-selective filtering elements are, typically, not tunable over the entire wavelength range of interest. For instance, with the advent of optical DWDM, the number of wavelength channels requiring routing in a particular optical fiber application may be on the order of one hundred to a thousand, and the total optical bandwidth may range between ten nanometers and hundreds of nanometers. Building a tunable wavelength filter that can be tuned over such a wide DWDM bandwidth is difficult. Another technological challenge stems from the need to route such wavelength channels at high speeds on a microsecond or faster time scale. These requirements place great demands on any technology, and are difficult to achieve in concert.

Figure 1:
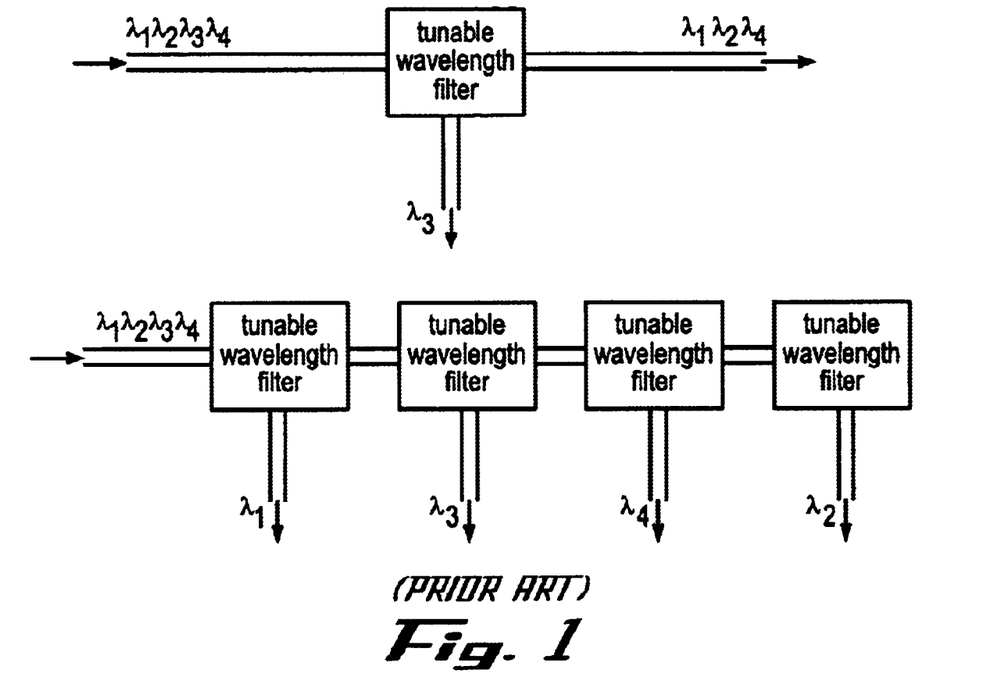
FIG. 1 is a block diagram representation of a tunable wavelength add/drop circuit and a demultiplexer in accordance with prior art.
Figure 2:
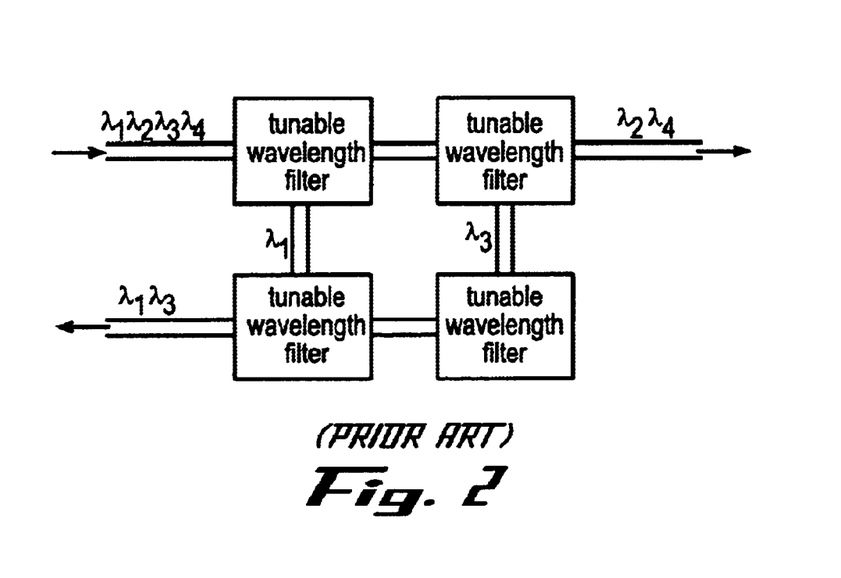
FIG. 2 is a block diagram representation of a demultiplexer configured to drop multiple wavelengths onto a single output optical fiber in accordance with prior art.

Two important, "building-block" circuits for routing wavelength channels in second generation optical and/or DWDM networks are likely to be (1) the tunable add/drop, in which one of "N" incoming wavelengths is dropped, and (2) the 1×N tunable wavelength demultiplexer, in which "N" wavelengths on an input channel are separated into "N" independent output channels, as shown in FIG. 1 (alternatively, the demultiplexer of FIG. 1 may be reconfigured to drop multiple wavelengths onto a single output optical fiber by using additional tunable wavelength filters, as depicted in FIG. 2). Due to reciprocity, these circuits may be used in reverse to perform wavelength add and N×1 wavelength multiplexing, respectively. In these circuits, 1 to "N" tunable wavelength filters are used to selectively "drop", or direct, a selected wavelength channel to an output optical fiber. Each such tunable wavelength filter should be tunable over all wavelength channels.

Figure 3:
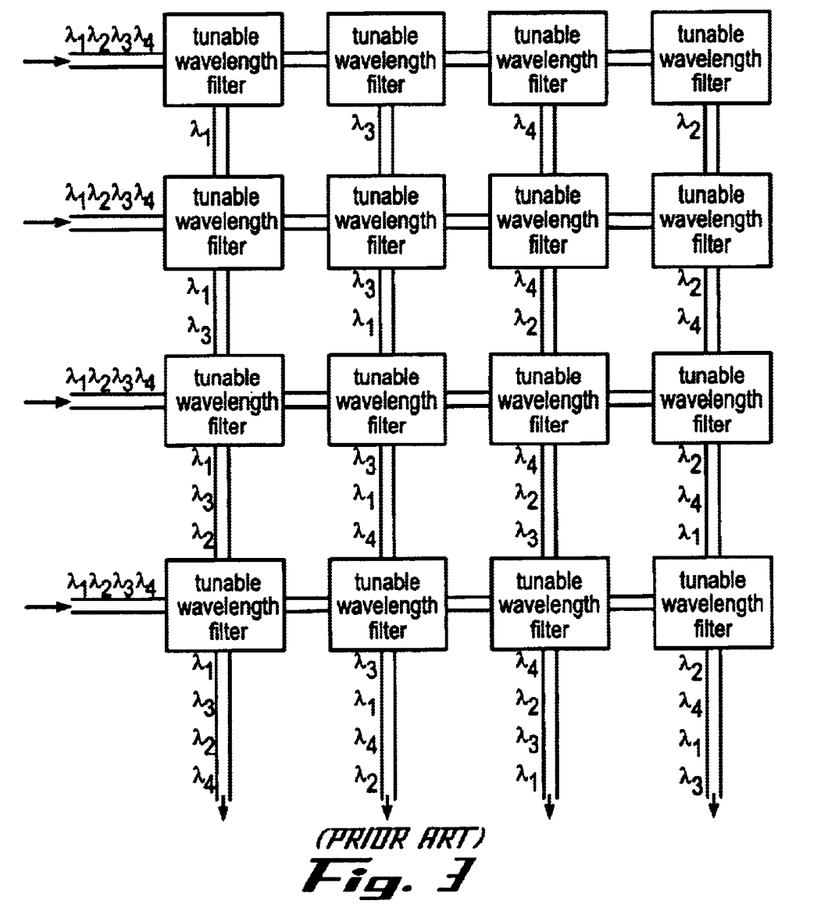
FIG. 3 is a block diagram representation of an N×N tunable wavelength routing switch in accordance with prior art.
Figure 4:
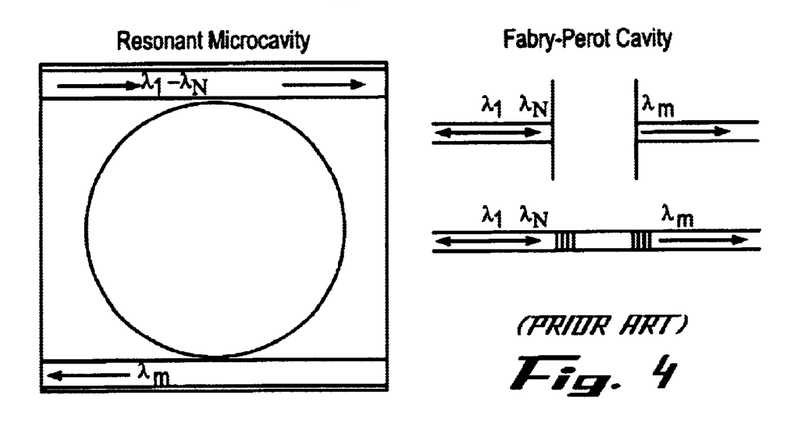
FIG. 4 is a block diagram representation of tunable filter elements based upon resonant optical cavities in accordance with prior art.

Another important circuit for routing wavelength channels in second generation optical and/or DWDM networks is likely to be the N×N wavelength routing switch circuit illustrated in FIG. 3. This circuit takes "N" inputs, each with "N" wavelengths, and routes one wavelength from each input to each output. Each output receives all "N" wavelengths, with each wavelength originating from a different input. As noted above, it is desirable for each of the $N^2$ wavelength filters to have the ability to independently access all "N" wavelength channels.

Many of the prior art tunable filter technologies suitable for dense integration on an optical chip cannot tune over the full DWDM bandwidth, thus making implementation of the above-described circuits (and a variety of other circuits) impractical. For instance, arrayed waveguide gratings, acousto-optical and electro-optical tunable filters, and Mach-Zehnder interferometer techniques are so limited. Similarly, while being suitable for dense integration, neither the traveling wave optical microcavity filter nor longitudinal Bragg gratings can tune over the full DWDM bandwidth.

The traveling wave optical microcavity filter, which includes a tuned optical cavity, has resonances that allow the transfer of specific wavelengths from an input optical channel to an output optical channel. The tuned optical cavity supports whispering gallery modes which behave very similarly to the longitudinal modes of a linear Fabry-Perot type cavity. Fabry-Perot type resonators may be implemented with optical fiber or integrated onto an optical chip using reflective interfaces or longitudinal Bragg gratings. The length of the cavity determines the resonance wavelengths; which are the wavelengths that pass from the input channel through the cavity to the output channel with high efficiency. These wavelengths, or frequencies, given by $$v_i = i \frac{c}{nL}$$

are periodic, with the period being given by the cavity free-spectral range ("FSR"), which is approximately $$FSR = \Delta v = \frac{c}{nL},$$

where "c" is the speed of light, "n" is the effective index of the cavity mode, and "L" is the round trip path length through the cavity. In DWDM systems, it is generally beneficial to have $\Delta v$ be greater than the total optical bandwidth, which is computed from the number of wavelength channels multiplied by the channel spacing. By doing so, a single wavelength channel may be operated upon without interference from other channels. Another condition that must be met is to have the resonance frequency passband, given by the expression $$\delta v = \frac{v}{Q},$$

where "v" is the resonance frequency and "Q" is the quality factor of the cavity (i.e., which is related to the losses in the cavity), be approximately equal to the wavelength channel spacing $v_{ch}$.

Additionally, it is desirable to have the ability to tune the resonance frequency by one free-spectral range, so that all wavelength channels may be operated upon by a single cavity. Such tuning may be achieved by varying the index of refraction. To tune over the entire free-spectral range by changing the index of refraction requires that $$\Delta n = \frac{\lambda}{2L} \quad \text{or} \quad \frac{\Delta n}{n} = \frac{\Delta v}{v}$$

be achieved. For more general situations in which the tuning range is less than the free-spectral range, the condition $\Delta v/v = \Delta n/n$ is still valid, where $\Delta v$ now represents the tuning range. For a number of tuning mechanisms, such as the electro-optic effect and the thermo-optic effect, the maximum achievable fractional index change, $\Delta n/n$, is of the order 0.01, meaning that the maximum cavity free-spectral range over which full tuning can be performed is $\Delta v \approx 0.01 v \approx 2$ THz, which is much smaller than the optical bandwidth of interest such as that made available, for example, by optical fiber amplifiers, and therefore smaller than the total bandwidth that may be used by high capacity DWDM networks.

Alternatively, the length of the cavity could be changed by the amount $$\frac{\Delta L}{L} = \frac{\Delta v}{v},$$

but again, large amounts of change, such as provided by the piezoelectric effect, are difficult to achieve. Utilization of both refractive index and cavity length changes may increase the tuning by about a factor of two, but such an increase may still not be enough to cover the desired wavelength range. However, it should be noted that MEMS type devices with moving parts may achieve this goal, but may be very difficult to stabilize to a specific wavelength channel, as a positioning accuracy of $$\frac{\delta L}{\Delta L} < \frac{\delta v}{\Delta v} \quad \text{or} \quad \frac{\delta L}{L} < \frac{\delta v}{v} \approx 10^{-4}$$

must be attained, where "$\delta L$" is the necessary positioning accuracy. Therefore, these refractive index and length change considerations make it very difficult for a single traveling wave optical microcavity filter to be tunable over all wavelength channels.

Similar to traveling wave optical microcavity filters and as noted above, prior art longitudinal Bragg gratings, which may be fabricated in an optical fiber or waveguide on an integrated optical chip, also cannot tune over the full DWDM bandwidth. A Bragg grating strongly reflects wavelengths that satisfy the condition $$\lambda_i = \frac{2n\Lambda}{i} \quad \text{or} \quad v_i = i \frac{c}{2n\Lambda},$$

where "$\Lambda$" is the grating spacing, "n" is the refractive index, and "i" is an integer. Bragg gratings are, typically, fabricated such that the grating spacing is one-half the wavelength (i.e., i=1), equal to the wavelength (i.e., i=2), or three-halves the wavelength (i.e., i=3). The free-spectral range, FSR, can be written as $$\Delta v = |v_{i+1} - v_i| = \frac{c}{2n\Lambda}.$$

In the communications bands, for such grating spaces, the free-spectral ranges would be approximately 200 THz, 100 THz, and 67 THz, respectively. Therefore, the free-spectral range of Bragg grating type filters, typically, exceeds the DWDM spectrum.

The frequency tuning range, $\Delta v$, of a Bragg grating may be written in terms of a refractive index change or grating spacing change $$\frac{\Delta v}{v} = -\frac{\Delta n}{n} = -\frac{\Delta \Lambda}{\Lambda},$$

where, again, the same limitations on refractive index and/or cavity length change apply. Therefore, the total tuning range may only be of the order of 2 THz, which is not sufficient to tune over the full DWDM bandwidth.

Typical optical DWDM systems operate with a 100 GHz or, more recently, a 50 GHz channel spacing. It is expected that such systems may ultimately employ hundreds of wavelengths in each of the "C" and "L" bands, as the width of each band is of the order of 10 THz. In order to implement filtering elements tunable over the entire range of one such band, fractional changes of approximately 0.05 in filter parameters are needed. Using presently available materials, a more practical fractional change of about 0.003, for example, gives a tuning range of about 600 GHz, or about 6 (for 100 GHz spacing) or 12 (for 50 GHz spacing) wavelength channels.

Therefore, there exists in the industry, a need for optical wavelength routing circuits having wavelength-selective filtering elements compatible with integrated optics and operable at high speeds which are tunable over all DWDM channels, and which address these and other related, and unrelated, problems.

SUMMARY OF THE INVENTION

Briefly described, the present invention comprises apparatus and methods, tunable and operable over all DWDM wavelength channels, for optically routing such channels. According to the present invention, incoming wavelength channels are separated into a plurality of sub-groups having a smaller optical bandwidth. Wavelength channels within each sub-group are then acted upon independently by a filter, or switch, which is tunable and operable over the reduced bandwidth of each sub-group. Where necessary, the sub-groups are then recombined to form a desired output composite channel.

In the preferred embodiments described herein, the present invention is embodied in two classes of dynamic wavelength routing circuits, including, for example and not limitation, 1×N and N×N circuits. In the first class of circuits, the filter free-spectral range (and, therefore, the necessary tuning range) is a fraction of the full DWDM bandwidth, and is represented as the bandwidth of a sub-group of wavelength channels. These circuits require that the wavelengths be divided into sub-bands by a DWDM demultiplexer and are more suitable for filters whose free-spectral range is typically less than the DWDM bandwidth (e.g., resonant cavities), such that tuning within each sub-group may be performed with filters having a single filter design. In the second class of circuits, the circuits include filters having a free-spectral range greater than the full DWDM bandwidth, but still have a limited tuning range (e.g., the filters include Bragg gratings and resonant cavities of small size). The filters of circuits in the second class must tune over different wavelength ranges to cover the entire DWDM bandwidth. Note that most types of circuits devised for the first class may be implemented by the second class of circuits, and vice versa. Circuits which represent a hybrid between the two classes are also described herein, and may provide additional flexibility not offered by circuits of the first or second classes alone.

It should be understood that while the present invention is described herein in the form of particular illustrative circuits, the present invention has applicability to a plurality of other circuits as well. Also, as described herein, practical filters may be tunable, for example, over six to twelve wavelength channels, while there may be a hundred or more channels, for example, which require routing. Therefore, use of the present invention for routing the entire number of possible channels may require division of the DWDM bandwidth into ten to twenty sub-groups of twelve to six wavelengths each. However, for simplicity of description and illustration, the circuits herein are described herein with reference to a greatly reduced number of wavelength channels. Thus, it is important to note that the present invention is not limited by the artificial constraints imposed for purposes of the description herein.

Accordingly, it is an object of the present invention to provide an apparatus and/or method for separating an incoming optical waveform into a plurality of sub-groups of wavelength channels having a smaller optical bandwidth than the incoming optical waveform.

Another object of the present invention to provide an apparatus and/or method for separating an incoming optical waveform into a plurality of sub-groups of wavelength channels having a smaller optical bandwidth than the incoming optical waveform and for recombining the sub-groups to form a desired output channel.

Still another object of the present invention to provide an apparatus and/or method for separating an incoming optical waveform into a plurality of sub-groups of wavelength channels having a smaller optical bandwidth than the incoming optical waveform and for tuning the channels of each sub-group.

Still another object of the present invention to provide an apparatus and/or method for cumulatively tuning the entire DWDM bandwidth by tuning a plurality of sub-groups of wavelength channels having a smaller optical bandwidth.

Other objects, features, and advantages of the present invention will become apparent upon reading and understanding the present specification when taken in conjunction with the appended drawings.

DETAILED DESCRIPTION OF THE PREFERRED EMBODIMENTS

Figure 5:
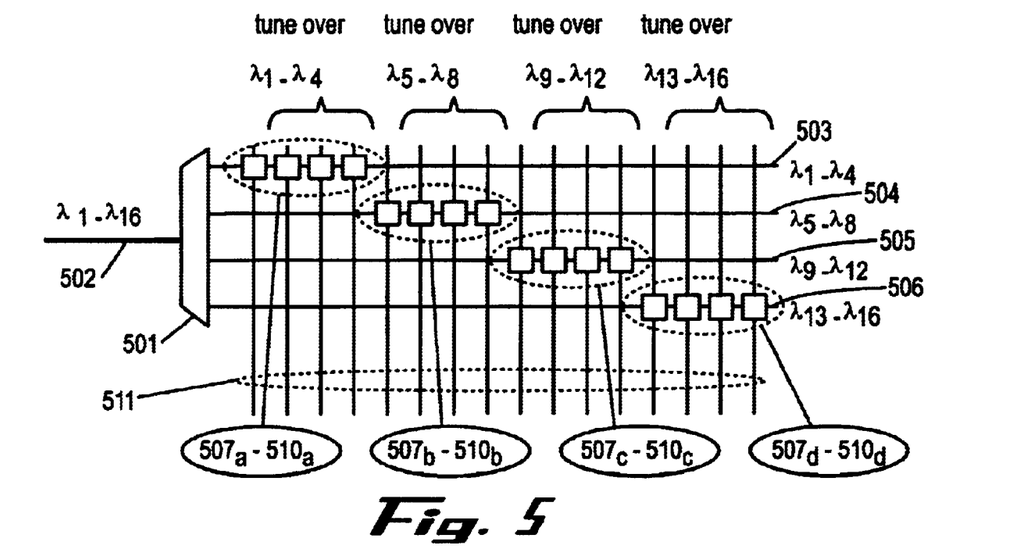
FIG. 5 is a block diagram representation of a tunable 1×N wavelength demultiplexer using wavelength sub-groups, according to an exemplary preferred embodiment of the present invention.

Referring now to the drawings, in which like numerals represent like components or steps throughout the several views, FIG. 5 displays an exemplary circuit of the first class of circuits (i.e., which includes circuits having a free-spectral range that is a fraction of the full DWDM bandwidth), including a 1×N demultiplexer, which is employed in or with a plurality of other circuits of the first class of circuits in a first set of preferred embodiments of the present invention. In the embodiments of the first set, a group of "N" incoming wavelength channels 501 are split into "M" sub-groups 503–506 using a wavelength demultiplexer 501 or similar wavelength filter (which is typically fixed, but may itself be tunable), with N/M wavelengths per sub-group. Tunable filters 507–510 then perform wavelength routing within each sub-group.

As shown in FIG. 5, a single input channel 502 (e.g., optical fiber or integrated optical waveguide), preferably, carries 16 wavelengths. These wavelengths are broken into four sub-groups 503–506 of four wavelengths each, with each sub-group carried by a separate path. Within each path there are four tunable wavelength filters 507–510 (i.e., where different subscripts indicate different sub-group filters), each of which can drop any one of the four wavelengths to an output channel 511. Each filter has a free-spectral range given by $$\Delta v = \frac{N}{M} v_{ch} = \frac{16}{4} v_{ch} = 4 v_{ch},$$

where $v_{ch}$ is the DWDM channel spacing. Thus, the circuit reduces the necessary free-spectral range by the factor "M" and, therefore, reduces the tuning requirements (i.e., such as the necessary refractive index or length change) by a factor of "M" as well.

Figure 6:
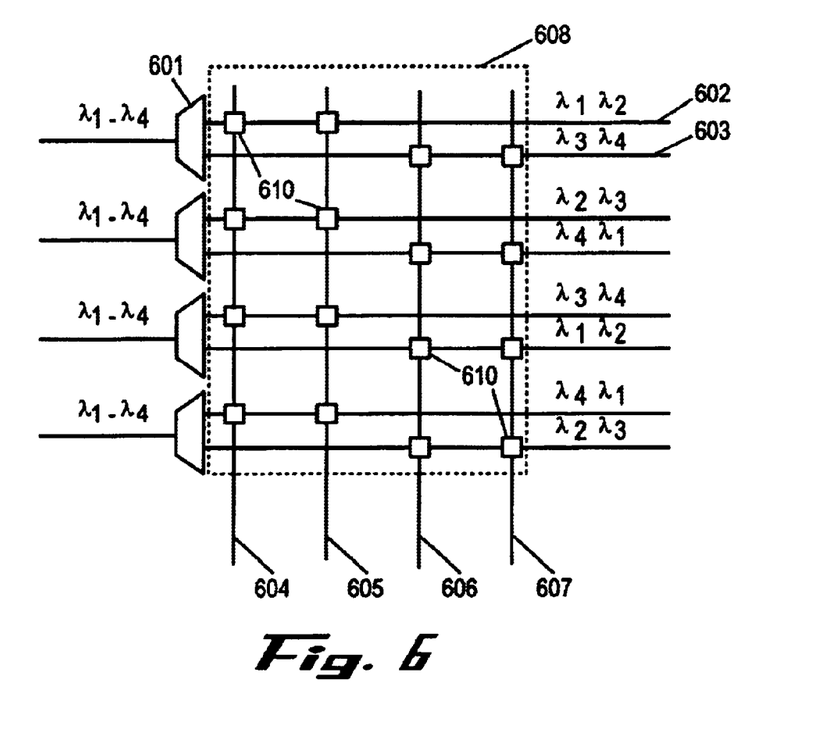
FIG. 6 is a block diagram representation of a tunable wavelength switch using wavelength sub-groups, according to an exemplary preferred embodiment of the present invention.
Figure 8:
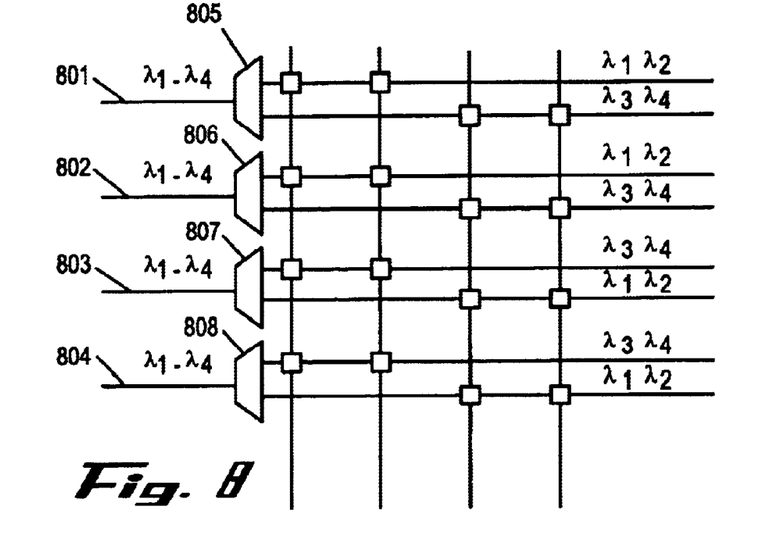
FIG. 8 is a block diagram representation of a tunable wavelength switch using simplified wavelength grouping, according to an exemplary preferred embodiment of the present invention.

The circuit of FIG. 5 may be used to implement an N×N wavelength switch using the 1×N demultiplexer as a building block, as shown in FIGS. 6 and 8. As described above, "N" wavelengths from each input are separated into N/M sub-groups by demultiplexer 601, where the sub-groups for each input are not necessarily the same. Each wavelength within each sub-group is routed to one of "M" outputs, where there are a total of "N" outputs (e.g., 604–607). Such circuits allow considerable flexibility in a wavelength routing process, in that arbitrary routing is possible given a fixed set of constraints.

Figure 7:
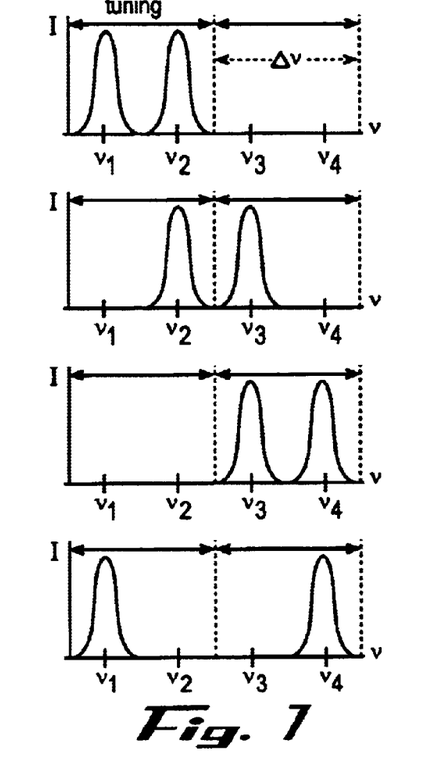
FIG. 7 is an illustration of a reduced tuning range, according to an exemplary preferred embodiment of the present invention.

In the circuit of FIG. 6, each input optical fiber carries four wavelengths for simplicity of description and illustration. The wavelengths are split into two sub-groups 602, 603 of two wavelengths at the input to the routing matrix 608 (i.e., where the squares in matrix 608 of FIG. 6 represent fixed or tunable filters 610). In order to reduce the free-spectral range of each filter 610, the wavelengths must be split such that no two wavelengths within a sub-group are separated by an integer multiple of the filter free-spectral range. All such possible (i.e., four of the six total) arrangements using four wavelengths are employed in the circuit of FIG. 6. These arrangements are displayed in more detail in FIG. 7, which shows the four possible choices of wavelength sub-groups obtained by breaking four wavelengths into groups of two wavelengths. All four of these groupings are utilized in the circuit of FIG. 6, while only two are used in the circuit of FIG. 8. In general, one would choose "M" wavelengths within a sub-group, so that the filter free-spectral (or tuning) range would be the product of "M" and the channel spacing. Within each sub-group, one cannot have wavelengths separated by a multiple of the free-spectral range. Otherwise, more than one wavelength could be filtered at a time since filter tuning is periodic with the period being given by the free-spectral range. In order to obtain full coverage of the input channel spectrum, one must have N/M sub-groups.

The circuit of FIG. 8 reduces the requirements on the DWDM demultiplexer at the inputs. In this circuit, the input wavelength band is split sequentially into N/M sub-groups, and the sub-groups are the same across all inputs (801–804). The circuit of FIG. 8 allows the use of wavelength demultiplexers 805–808 with simplified passbands (i.e., where the width of the passband is approximately equal to the product of the number of wavelengths in the sub-group and the channel spacing) to be used for each sub-group. In the circuit of FIG. 8, the wavelength demultiplexer at each input channel needs only have two passbands, one to pull out wavelengths 1 and 2, and one to pull out wavelengths 3 and 4. A demultiplexing filter, acceptable in accordance with the circuit of FIG. 8, includes Bragg gratings, resonant cavity type filters, phased array filters, or other similar filters.

Figure 9:
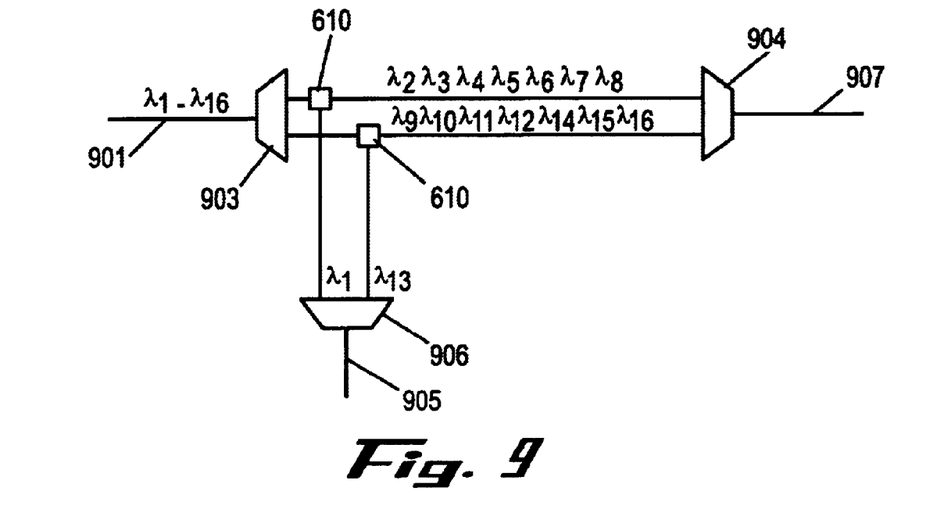
FIG. 9 is a block diagram representation of a tunable multi-wavelength add/drop circuit using wavelength grouping, according to an exemplary preferred embodiment of the present invention.

The multi-wavelength add/drop circuit of FIG. 9 represents another circuit in accordance with the first set of preferred embodiments of the present invention. As in the other circuits according to the first set of preferred embodiments, the filter free-spectral range is a fraction of the full DWDM bandwidth. In this circuit, sixteen wavelengths on an input fiber 901 are broken into two sub-groups 902, 903 along two separate paths. The wavelengths chosen for each sub-group are subject to the restrictions described above. The wavelengths that are not filtered out (i.e., not dropped) are combined by a passive wavelength multiplexer 904 to continue on the transmission channel 907. The dropped wavelengths are also combined by a wavelength multiplexer 906 onto a single drop channel 905. Because the wavelength groupings remain fixed throughout the entire circuit, the wavelength demultiplexer 903 and multiplexers 904, 906 have identical passbands. In addition, this circuit may also be used to add wavelength channels by routing, or placing, those channels on the drop output. The filters 610 are tuned to pick-off any one of the eight wavelength channels in their respective sub-groups.

The embodiments of the first set of preferred embodiments described above employ wavelength demultiplexers to reduce the number of frequency channels incident on each tunable filter 610, which therefore reduces the necessary free-spectral range. In those embodiments, the filter tuning occurs over the entire free-spectral range of the sub-group. In order to accommodate the reduced free-spectral range, no two frequency channels within a sub-group can be separated by an integer multiple of the free-spectral range, so that the filter drops only one wavelength at a time. In those embodiments, all of the filters are substantially identical. Further, every circuit has an analog suitable for large free-spectral range filters, but the wavelength patterns within each sub-group may differ.

In a second set of preferred embodiments of the present invention, the circuits eliminate the need for wavelength demultiplexers at the inputs, but include filters that are all different (i.e., in the sense that their bare resonant frequencies are different) and have larger free-spectral ranges (i.e., larger than those of the circuits of the first set of preferred embodiments) that are greater than the bandwidth of all wavelength channels. These embodiments are more appropriate for grating-based tunable filters and small resonant cavities. Also, in these embodiments, the wavelengths must be grouped in a sequential manner. For brevity, only one such embodiment is described below, but it is understood that other embodiments are within the scope of the present invention.

Figure 10:
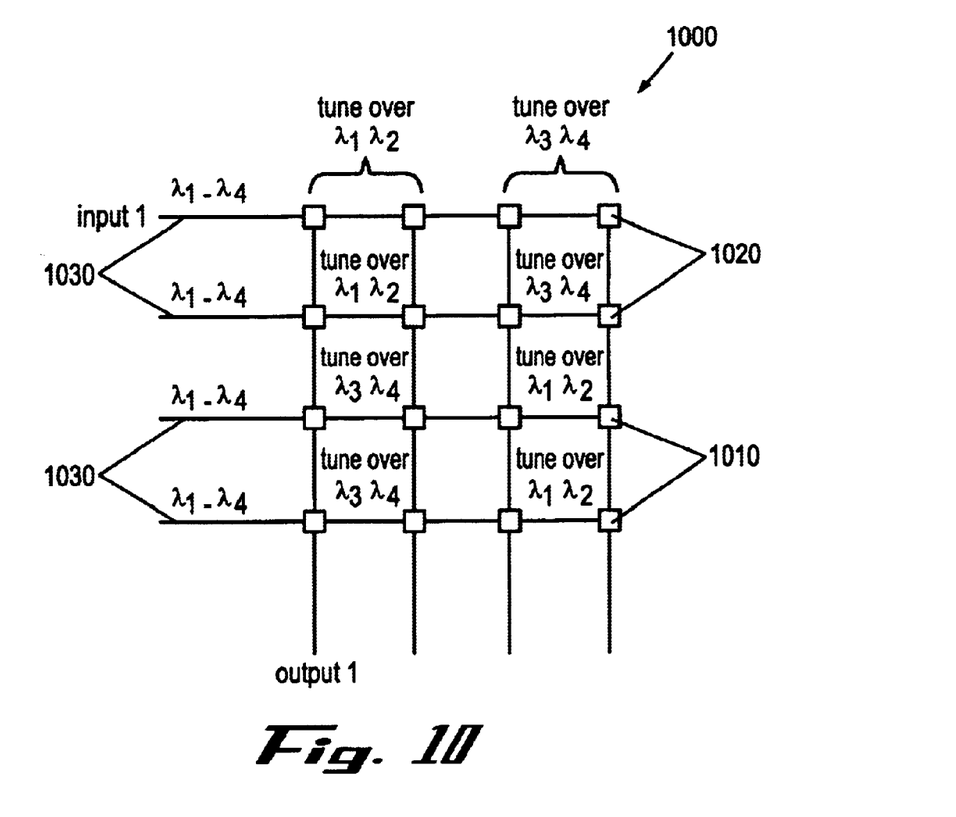
FIG. 10 is a block diagram representation of an N×N wavelength switch, according to an exemplary preferred embodiment of the present invention.
Figure 11:
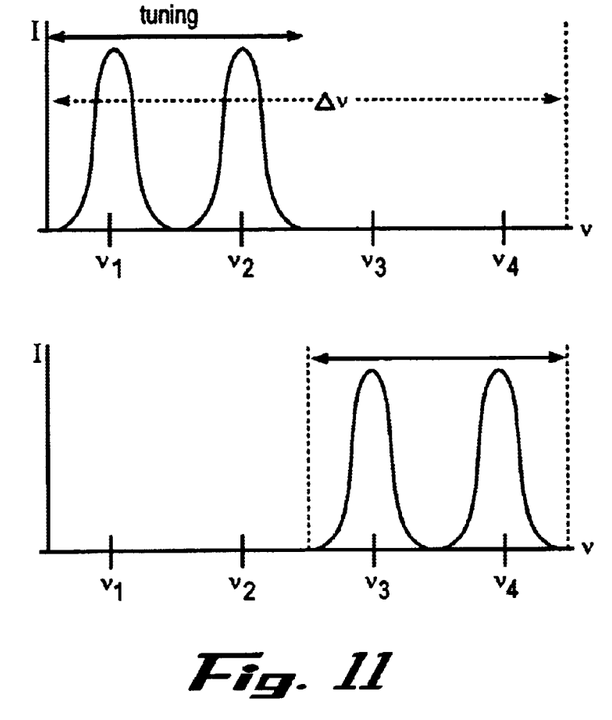
FIG. 11 is a pictorial representation of a tuning range for resonant filters with large free-spectral range, according to an exemplary preferred embodiment of the present invention.

FIG. 10 displays an N×N wavelength routing switch circuit 1000, in accordance with the second set of preferred embodiments, which comprises a plurality of filters (or switches) 1010 having a limited tuning range (i.e., less than the free-spectral range in the case of resonant filters). The routing switch circuit 1000, for purposes of simplifying the description, has only four wavelengths per input channel 1030. As seen in FIG. 10, the routing switch circuit 1000 includes two different types of filters: a first plurality of filters 1010 that are tunable over wavelengths 1 and 2; and, a second plurality of filters 1020 that are tunable over wavelengths 3 and 4. The difference in the filters 1010, 1020 may be created through the use of a difference in cavity length for resonant filters or a difference in grating spacing for Bragg grating filters. The operation of the resonant filters 1010, 1020 of the N×N wavelength routing switch circuit 1000 (i.e., those with large free-spectral range and small tuning range) is illustrated by FIG. 11. Operation with grating filters is similar.

In many optical wavelength routing applications, it is desirable to drop one of "N" wavelengths from an input channel onto a single output channel. With prior art devices, a tunable filter having a tuning range over the entire DWDM bandwidth would be required to implement the dropping of the wavelength. However, using the present invention, the dropping of the wavelength is accomplished by splitting the input wavelengths into N/M sub-bands (or sub-groups), as illustrated for sixteen input wavelengths and four sub-bands (or sub-groups) with the hybrid circuit 1200 of FIG. 12. The hybrid circuit 1200 utilizes DWDM multiplexers 1202, 1203 and demultiplexer 1201 in order to perform wavelength grouping and utilizes filters 1204–1207 with large free-spectral range and different tuning ranges.

Figure 12:
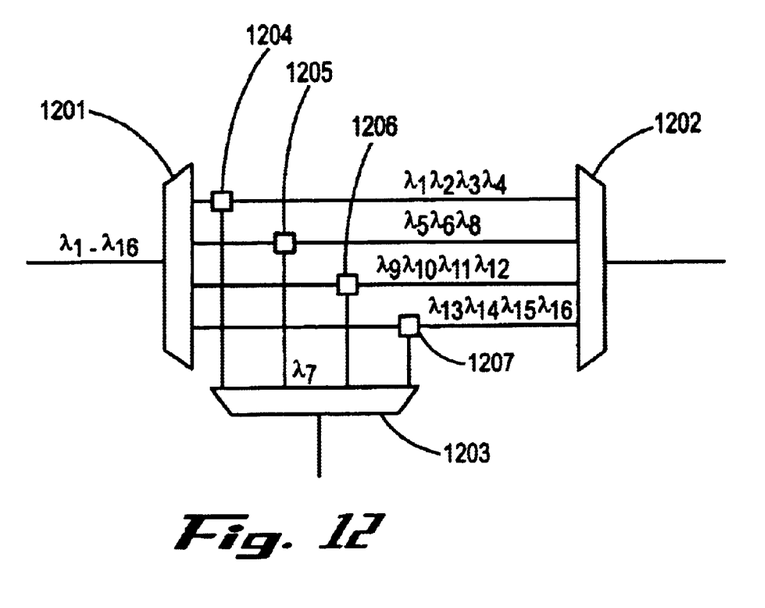
FIG. 12 is a block diagram representation of a tunable single wavelength add/drop circuit using wavelength grouping, according to an exemplary preferred embodiment of the present invention.
Figure 13:
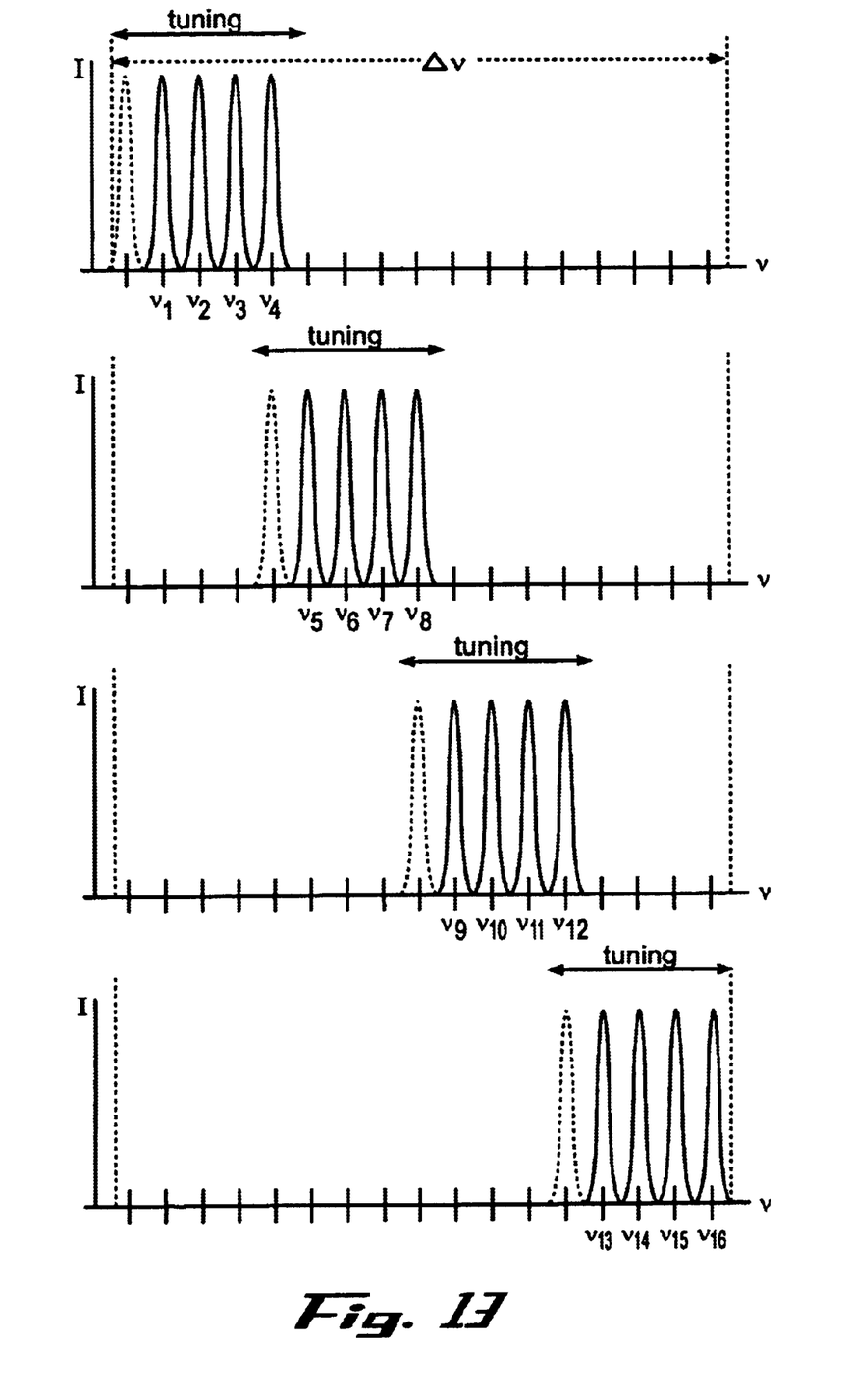
FIG. 13 is a pictorial representation of a blank wavelength channel within a wavelength sub-group for making a filter transparent, according to an exemplary preferred embodiment of the present invention.

Since one wavelength from only one of the four sub-bands (or sub-groups) is to be dropped, a method for making each filter 1204–1207 completely transparent must be utilized. According to such a method, each filter 1204–1207 is allowed to tune over a frequency range given by the product of M+1 and the channel spacing. Since only "M" wavelengths are present within each sub-band (or sub-group), the extra tuning location is therefore empty, and tuning to this position will allow all "M" wavelengths in the sub-band to pass without being dropped, as shown in FIG. 13. In order to reduce operating power requirements, it is desirable to make the location of the empty tuning slot equal to the passband location of the filter with no physical parameter change. By doing so, only the filter 1204–1207 that need be tuned is the one selecting the desired wavelength from the appropriate sub-band and, hence, less operating power is required.

Whereas this invention has been described in detail with particular reference to its preferred embodiments, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

What is claimed is:

1. An apparatus for optically routing wavelength channels over at least a portion of the dense wavelength division multiplexed (DWDM) bandwidth, said apparatus comprising:
    a first optical element adapted to separate a plurality of input DWDM wavelength channels into a plurality of sub-groups of DWDM wavelength channels, each sub-group of DWDM wavelength channels having a bandwidth less than the bandwidth of said plurality of input DWDM wavelength channels; and,
    a plurality of tunable wavelength filtering elements, each adapted to receive a respective sub-group of DWDM wavelength channels from said first optical element and having a limited tuning range selected for operation with he bandwidth of said respective sub-group of DWDM wavelength channels.

2. The apparatus of claim 1, wherein a tunable wavelength filtering element of said plurality of tunable wavelength filtering elements comprises a tunable standing wave resonant cavity.

3. The apparatus of Claim 1, wherein a tunable wavelength filtering element of said plurality of tunable wavelength filtering elements comprises a tunable traveling wave resonant cavity.

4. The apparatus of claim 1, wherein a tunable wavelength filtering element of said plurality of tunable wavelength filtering elements comprises a tunable grating.

5. The apparatus of claim 1, wherein a tunable wavelength filtering element of said plurality of tunable wavelength filtering elements has a filter free-spectral range greater than the bandwidth of said respective sub-group of DWDM wavelength channels receivable by said tunable wavelength filtering element and less than the total bandwidth across all input DWDM wavelength channels of said plurality of input DWDM wavelength channels, and wherein said limited tuning range of said tunable wavelength filtering element is no greater than said filter free-spectral range.

6. The apparatus of claim 1, wherein a tunable wavelength filtering element of said plurality of tunable wavelength filtering elements has a filter free-spectral range greater than the total bandwidth across all input DWDM channels of said plurality of input DWDM wavelength channels, wherein said limited tuning range of said tunable wavelength filtering element is not less than the bandwidth of said respective sub-group of DWDM wavelength channels receivable by said tunable wavelength filtering element, and wherein said limited tuning range of said tunable wavelength filtering element is less than said filter free-spectral range.

7. The apparatus of claim 1, wherein said first optical element and said plurality of tunable wavelength filtering elements are operable to perform tunable 1×N demultiplexing.

8. The apparatus of claim 1, wherein said first optical element and said plurality of tunable wavelength filtering elements are operable in reverse to perform tunable N×1 multiplexing.

9. The apparatus of claim 1, wherein said first, optical element and at least one tunable wavelength filtering element of said plurality of tunable wavelength filtering elements are operable to tunably select a single input DWDM wavelength channel of said plurality of input DWDM wavelength channels for placement of said single input DWDM wavelength channel onto a drop output channel.

10. The apparatus of claim 9, wherein said apparatus further comprises a wavelength multiplexer operable to multiplex unselected input DWDM wavelength channels of said plurality of input DWDM wavelength channels onto a transmission output channel.

11. The apparatus of claim 1, wherein said first optical element and said plurality of tunable wavelength filtering elements are operable to tunably select respective input DWDM wavelength channels of said plurality of input DWDM wavelength channels for placement of said respective input DWDM wavelength channels onto a drop output channel.

12. The apparatus of claim 11, wherein said apparatus further comprises a wavelength multiplexer operable to multiplex said respective input DWDM wavelength channels onto said drop output channel.

13. The apparatus of claim 1, wherein at least one tunable wavelength filtering element of said plurality of tunable wavelength filtering elements is configurable to tune over one more DWDM wavelength channel than the number of DWDM wavelength channels present in said respective sub-group of DWDM wavelength channels receivable by said at least one tunable wavelength filtering element, and wherein said at least one tunable wavelength filtering element is operable to allow all DWDM wavelength channels present in said respective sub-group of DWDM wavelength channels to pass when said at least one tunable wavelength filtering element is configured to tune to said one more DWDM wavelength channel.

14. The apparatus of claim 1, wherein said first optical element and said plurality of tunable wavelength filtering elements are operable to perform tunable N×N wavelength switching.

15. An apparatus for optically routing wavelength channels over at least a portion of the dense wavelength division multiplexed (DWDM) bandwidth, said apparatus comprising:
    a plurality of tunable wavelength filtering elements, each adapted to receive a respective sub-group of DWDM wavelength channels of a plurality of DWDM wavelength channels and having a limited tuning range selected for operation with the bandwidth of said respective sub-group of DWDM wavelength channels, the bandwidth of said respective sub- group of DWDM wavelength channels being smaller than the total bandwidth of said plurality of DWDM wavelength channels;

wherein the filter free-spectral range of at least one tunable wavelength filtering element of said plurality of wavelength filtering elements is greater than the total bandwidth across all DWDM wavelength channels of said plurality of DWDM wavelength channels; and, wherein said limited tuning range of said at least one tunable wavelength filtering element is not less than the bandwidth of said respective sub-group of DWDM wavelength channels receivable by said at least one tunable wavelength filtering element, and wherein said limited tuning range of said at least one tunable wavelength filtering element is less than said filter free-spectral range.

16. The apparatus of claim 15, wherein a tunable wavelength filtering element, of said plurality of tunable wavelength filtering elements comprises a tunable standing wave resonant cavity.

17. The apparatus of claim 15, wherein a tunable wavelength filtering element of said plurality of tunable wavelength filtering elements comprises a tunable traveling wave resonant cavity.

18. The apparatus of claim 15, wherein a tunable wavelength filtering element of said plurality of tunable wavelength filtering elements comprises a tunable grating.

19. The apparatus of claim 15, wherein said plurality of tunable wavelength filtering elements are operable to perform tunable 1×N demultiplexing.

20. The apparatus of claim 15, wherein said plurality of tunable wavelength filtering elements are operable in reverse to perform tunable N×1 multiplexing.

21. The apparatus of claim 15, wherein at least one tunable wavelength filtering element of said plurality of tunable wavelength filtering elements is operable to tunably select a single DWDM wavelength channel of said plurality of DWDM wavelength channels for placement of said single DWDM wavelength channel onto a drop output channel.

22. The apparatus of claim 21, wherein said apparatus further comprises a wavelength multiplexer operable to multiplex unselected DWDM wavelength channels of said plurality of DWDM wavelength channels onto a transmission output channel.

23. The apparatus of claim 15, wherein said plurality of tunable wavelength filtering elements are operable to tunably select respective DWDM wavelength channels of said plurality of DWDM wavelength channels for placement of said respective DWDM wavelength channels onto a drop output channel.

24. The apparatus of claim 23, wherein said apparatus further comprises a wavelength multiplexer operable to multiplex said respective DWDM wavelength channels onto said drop output channel.

25. The apparatus of claim 15, wherein said plurality of tunable wavelength filtering elements are operable to perform tunable N×N wavelength switching.

26. The apparatus of claim 15, wherein at least one tunable wavelength filtering element of said plurality of tunable wavelength filtering elements is configurable to tune over one more DWDM wavelength channel than the number of DWDM wavelength channels present in said respective sub-group of DWDM wavelength channels receivable by said at least one tunable wavelength filtering element, and wherein said at least one tunable wavelength filtering element is operable to allow all DWDM wavelength channels present in said respective sub-group of DWDM wavelength channels to pass when said at least one tunable wavelength filtering element is configured to tune to said one more DWDM wavelength channel.

\* \* \* \* \*